United States Patent Office 3,427,889
Patented Feb. 18, 1969

3,427,889
ADJUSTING MECHANISM
Sidney J. Baum, Encino, Calif., assignor to Baum Chemical Corporation, El Segundo, Calif., a corporation of California
Filed Nov. 13, 1967, Ser. No. 682,457
U.S. Cl. 74—89.15                                       5 Claims
Int. Cl. F16h 57/00

ABSTRACT OF THE DISCLOSURE

In a mechanism where rectilinear motion is required for the adjustment of a movable member relative to another member, a linkage mechanism connecting the respective members is provided. Adjustment of the movable member is accomplished by lengthening or shortening one bar of the linkage mechanism. It is particularly adaptable to adjusting flow controls, such as the dies, of a sheet extruding machine.

Background of the invention

This invention relates in general to a linkage mechanism for adjusting the position of a movable member relative to a fixed member and more specifically, to film or sheet extruding machines wherein the opening is adjusted at closely spaced intervals between fixed and movable die members, or other flow regulating parts, across the width of the machine.

The mechanism according to this invention is particularly useful on machines for extruding plastic film or sheet material wherein the length of the opening at the dies or other regulating parts is formed by two elongated members, one fixed and the other flexible and movable relative to the fixed member for adjusting the opening therebetween.

In plastic film or sheet extruders, for example, the plastic material is first heated to melting temperature and caused to flow into a manifold which eventually leads to an elongated opening formed by die members, one of the members being fixed and the other movable relative to the fixed member. These die members are at the extreme end or outlet of the extruding machine. Upstream therefrom, however, another similar arrangement may be placed for throttling the flow of plastic material to the die members. Here, also, a fixed member and an adjustable member sometimes referred to as a "choker bar," are positioned. The adjustable choker bar cooperates with the fixed member to form an opening therebetween.

Due to the nature of the plastic film or sheet extrusion process, ther are many variables which make it necessary to frequently and finely adjust the opening between the fixed and movable members of the extruding machine at either the choker bar or the die position, or both. The thickness of the sheet or film is determined somewhat by both adjustment of the choker bar and the dies. In order to produce a uniform film or sheet across the entire extent of the elongated opening, it is usually necessary to be able to precisely adjust the movable choker bar and die at closely spaced intervals. The type of material being extruded, temperature fluctuations, melt flow variations and back pressure conditions are among the variables requiring adjustment of the openings at closely spaced intervals, or stations, across the machine.

In the past, it has been proposed to adjust the movable members of the extruder by means of threaded studs and jacks or spool pieces which raise or lower the movable members as required. These studs normally are threaded into the movable member. The studs are also normally passed through a retained jack or spool piece so that adjustment of the movable member results from turning of the jack or spool piece.

Several problems are connected with this jack or spool piece type adjustment mechanism. Among them, frequent turning of the jack or spool piece causes the heads thereof to become deformed and eventually they tend to crack or they are squeezed to such an extent that binding occurs. Also, the combination of frequent torsion, flexing and tensile forces on the studs eventually causes them to fail, usually at a point close to the junction of the stud and the movable member. When these studs fail, it is necessary to shut down and disassemble the machine for replacement of the parts.

Summary

It is an object of this invention to provide improved mechanism for adjusting te movable member of the extruding machines which overcomes disadvantages of the jack or spool piece adjusting mechanism referred to above. A simple and economical mechanism is provided for adjusting the movable members at closely spaced intervals without applying torsion and flexing forces.

Another object of this invention is to provide a mechanism which will impart rectilinear adjusting force to the movable members in a true plane in which the member is to be moved or adjusted.

Other objects and advantages will appear from the following description of a preferred embodiment of the invention.

Figure 1:
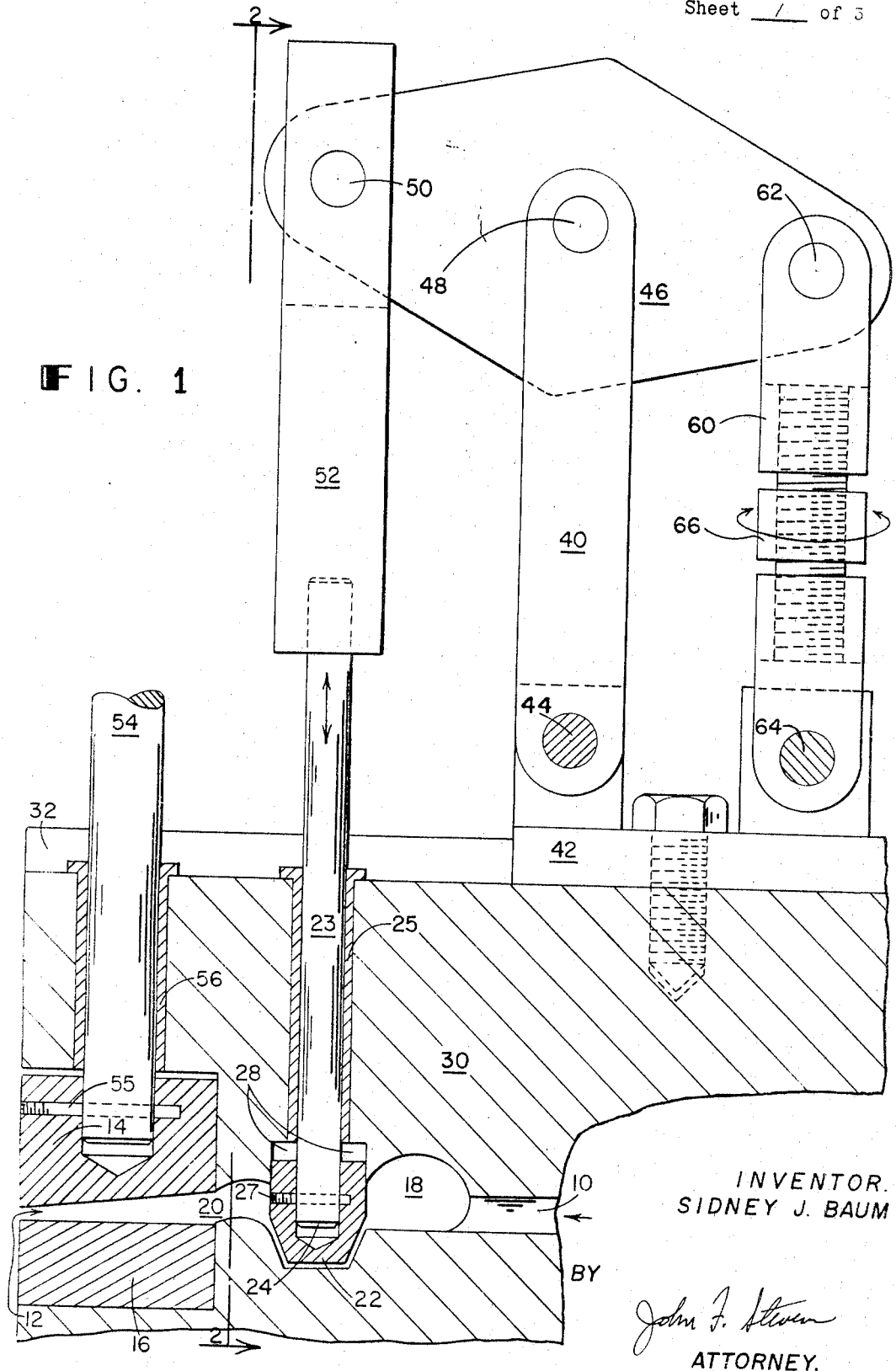
FIG. 1 is an elevation view in section of an extrusion die showing one of the mechanisms according to my invention.
Figure 2:
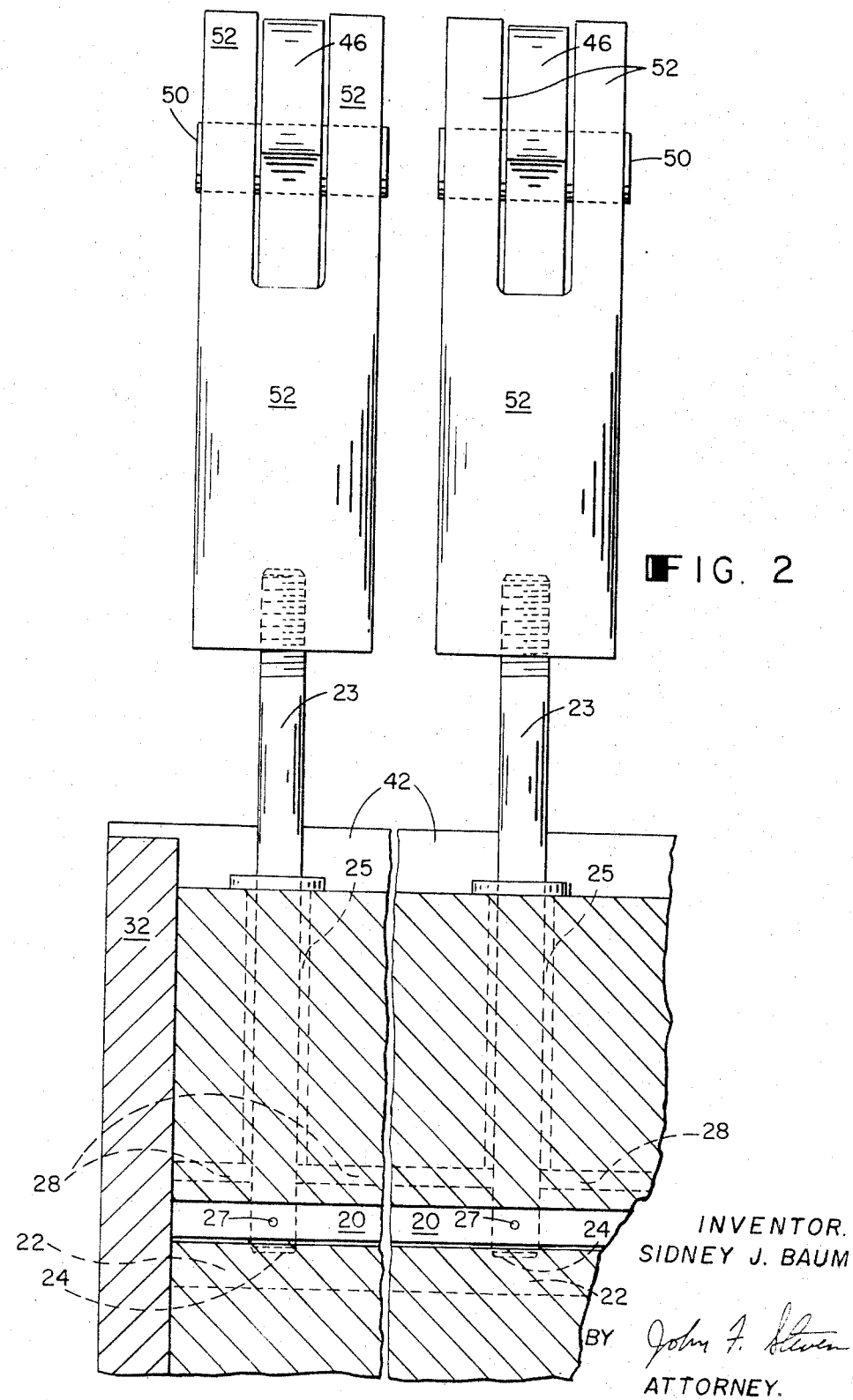
FIG. 2 is a front elevation view, partially in section, of two adjacent mechanisms according to my invention on a sheet extrusion machine, taken substantially along line 2—2 of FIGURE 1.
Figure 3:
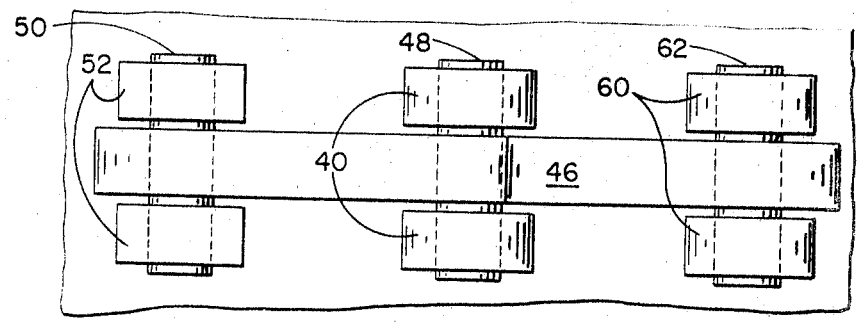
FIG. 3 is a plan view of one of the adjusting mechanisms shown in FIGURES 1 and 2.

Referring to the drawings in which one preferred embodiment of the invention is shown, plasticized material is delivered under pressure from an extrusion nozzle (not shown) to the passage 10 for subsequent flow through an elongated slot 12 formed between upper and lower die members 14 and 16 respectively for formation of a film or sheet of predetermined width, corresponding to the length of the slot 12. From the passage 10, the plasticized material may first enter a manifold 18 which extends in the direction of the slot 12. Prior to entering the final passage 20 immediately upstream from the die members 14 and 16, the plasticized material passes by a throttling gate formed by an elongated "choker" bar 22 extending substantially for the length of, and parallel to, the slot 12.

Choker bar 22 is adjustable in a direction generally perpendicular to the flow of plasticized material and acts as a preliminary valve to control the quantity of material flowing to the die members 14 and 16 and the pressure at the die members 14 and 16. Choker bar 22 may conveniently be tapered at its botom to correspond generally to the taper of channel walls 24 and 26. As shown, choker bar 22 is retractable into an opening 28 formed in block 30, and is adjusted by movement of the rod 23 in bushing 25. Rod 23 is connected to bar 22 by means of pin 27. The sides of the film extruder may conveniently be formed by block 32 and a similar block on the other side (not shown). The flow path of plasticized material shown in the drawings is generally considered to be conventional.

Both the choker bar 22 and upper die member 14 are adjustable in a direction substantially perpendicular to the flow of plasticized material, to open and close passages and thereby control the flow of plasticized material. Suitable adjusting mechanisms must be provided at closely spaced stations across the width of the machine to finely adjust the positions at the individual stations, of the choker bar 22 and upper die member 14, which are both flexible. Conditions which exist in a film or sheet extruder require different gap openings across the width of the machine at the different stations. For example, to obtain a sheet of uniform thickness, variations of pressure, temperature, material peculiarities, etc., must be compensated for by adjusting the gap at the choker bar 22 and the opening of the slot 12 at closely spaced intervals across the width of the machine. Under certain conditions, it may be desirable to slightly bend both the choker bar 22 and upper member 14 to irregular shapes to provide for a uniformly thick sheet. Normally, if the manifold 10 leads into the center of the width of the extruding die, there will be a pressure differential along the length of the slot, with the pressure being greater at the center, and lesser at the ends. This would necessitate a compensation for the pressure differential by providing greater passage openings at the ends than at the center. Further by way of example, portions of the extruding machine may be operating at different temperatures, causing differences in viscosity, which would require compensating adjustments.

To physically make the adjustments referred to above, on both the upper die member 14 and the choker bar 22, a novel adjusting mechanism has been provided by the present invention which has been found to be very desirable, and possess many advantages over conventional threaded stud or jack type adjusting mechanisms. For clarity, the adjusting mechanism according to this invention is shown only in connection with the choker bar 22. It should be understood, however, that this type mechanism may be ubsed for adjusting upper die member 14 as well as the choker bar 22, and preferably may be used for adjusting both the choker bar 22 and the die member 14. Alternately, conventional adjusting mechanism may be used on one, and the adjusting mechanism according to this invention on the other.

The adjusting mechanism according to this invention is probably best illustrated in FIGURE 1. It should be understood that these mechanisms are conveniently placed at closely spaced intervals or stations where it is desired to adjust the die member 14 or the choker bar 22.

Each of the adjusting mechanisms includes a linkage which comprises an arm 40 pivotally mounted to a plate 42 by a pin 44, which may conveniently extend for the width of the machine and be common to each of the mechanisms. The arm 40 is pivotally connected to an intermediate portion of cross bar 46 by pin 48. Cross bar 46 is pivotally connected, by means of pin 50, to arm 52, into which rod 23 is threaded or otherwise received. Rod 23 extends through and is slidable in bushing 25, fixed in block 30, which serves to keep rod 23 in alignment and move in a rectilinear path when adjustment is being made. Rectilinear movement of rod 23 occurs when linkage arm 60 is shortened or lengthened. Linkage arm 60 is pivotally attached to cross bar 46 by means of pin 62. The other end of member 60 is pivotally secured to plate 42 by means of pin 64, which just as pin 44, may extend for the width of the machine and be common to any given number, or all, of the adjusting mechanisms. For similar operation, upper die 14 is connected to rod 54 by means of pin 55.

Figure 4:
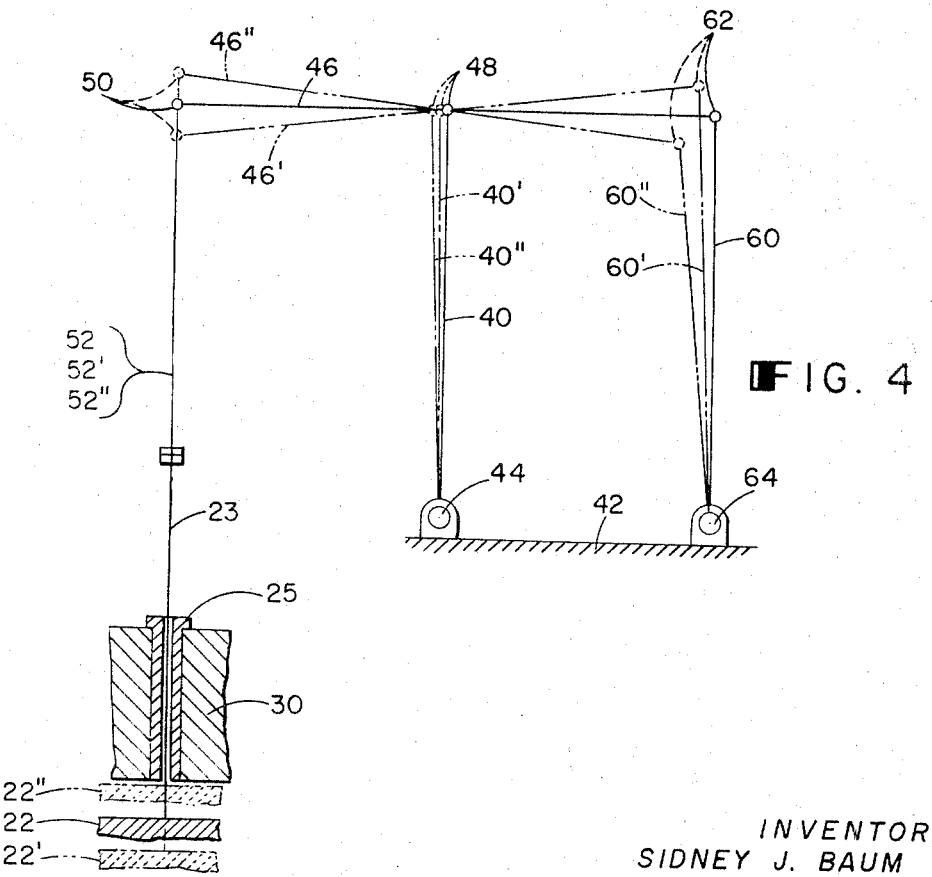
FIG. 4 is a diagram (not to scale) illustrating three different settings of the adjusting mechanism.

Member 60 is unique in that its length may be varied, that is, lengthened or shortened, by turning the threaded turnbuckle 66. Rectilinear motion of rod 23 results as the mechanism moves about fixed pivot points 44 and 64, and movable pivot points 48, 50 and 62. The manner in which the mechanism operates may be seen from the diagrammatic sketch illustrated in FIGURE 4. In this sketch, the solid lines 46, 40 and 60 indicate positions of the respective arm in a central positon. Broken lines 46', 40' and 60' indicate relative positions of the respective arms when in a more closed position. Broken lines 46", 40", and 60" indicate relative positions of the respective arms when in a more open position. Likewise, 22' illustrates a position of choker bar 22 in a somewhat closed position, while 22" illustrates a position of choker bar 22 in a somewhat open position.

In operation, as the arm 60 is lengthened or shortened, from the position shown in full lines, it rotates counterclockwise about pivot 64. At the same time, arm 40 moves counterclockwise about its pivot 44. If the arm 60 is shortened, this causes cross bar 46 to move clockwise about pivot 48, thereby pulling rod 23 upwards. Conversely, if the arm 60 is lengthened, this causes bar 46 to move counterclockwise about pivot 48, thereby lowering rod 23. All movement of rod 23 is therefore rectilinear, in the instance shown in the drawings, vertical.

Pin connections between the adjusting mechanisms and the parts to be adjusted are very desirable because the pin connections permit easier flexing action of the die lip and choker bar. However, since there is no torque on the rods 23 and 54, they could very easily be threaded to the choker bar 22 or upper die 14 respectively. The choker bar and die member may rotate about the pins to allow bending movement whereas threaded connections are rigid. Thus, excessive strain which occurred prior to my invention on threaded studs is eliminated. Also, damaging torsion which was by necessity applied to the studs is eliminated by the present invention. There is consequently much less chance of failure of the studs, and much downtime is prevented.

It will be understood that various changes in the details, materials, steps, and arrangements of parts, which have been herein described and illustrated in order to explain the nature of the invention, may be made by those skilled in the art within the scope of the invention as expressed in the appended claims.

I claim:
1. In an extruder having an elongated opening for extruding material in sheet-like form and a flexible, movable bar substantially coextensive therewith for adjusting the size of said opening, individual means for adjusting the position of said bar at a plurality of stations throughout the length thereof, said means at each station comprising:
  (a) an arm connected to said bar and movable rectilinearly for adjusting the position of said movable bar,
  (b) means for moving said arm to change the position of at least a part of said bar including a linkage of cooperating, pivoted members,
  (c) said linkage being attached by means of one of its members to said arm and attached by means of another member to a fixed support,
  (d) one of said arms of said mechanism being adjustable in length, and
  (e) means responsive to changes in length of said adjustable length arm to subject said first arm to rectilinear movement.

2. An extruder according to claim 1 in which said adjustable length bar includes a turnbuckle, 3. An extruder according to claim 1 in which said individual means for adjusting the position of said bar are spaced approximately symmetrically about the center of the extruder opening.

4. An extruder according to claim 1 in which said individual means for adjusting the position of said bar are spaced approximately equally across the width of the extruder.

5. In an extruder having an elongated opening for extruding material in sheet-like form and a flexible, movable bar substantially coextensive therewith for adjusting the size of said opening, individual means for adjusting the position of said bar at a plurality of stations throughout the length thereof, said means at each station comprising:
  (a) a first arm connected to said bar and movable rectilinearly for adjusting the position of said movable bar,
(b) a crossbar pivotally connected to said first arm,
(c) a second arm pivotally connected to said crossbar at one end and pivotally connected to a fixed support at the other end,
(d) said second arm being adjustable in length by means of a turnbuckle,
(e) a third arm pivotally connected to said crossbar at a position between the connections of said first and second arm to said crossbar, and said third arm also being pivotally connected to a fixed support,
(f) whereby adjustment in length of said second arm causes said linkage mechanism to move said first arm and said bar in a rectilinear path.

References Cited

UNITED STATES PATENTS

| | | | |
|---|---|---|---|
| 60,718 | 1/1867 | Grambo | 18—4 |
| 2,548,807 | 4/1951 | Morgan et al. | 74—41 |
| 2,696,640 | 12/1954 | Wienand | 18—12 |
| 2,851,959 | 9/1958 | Kangas | 74—89.15 |
| 2,943,347 | 7/1960 | Archibald | 18—4 |

FOREIGN PATENTS 80,053    1951    Czechoslovakia.

FRED C. MATTERN, JR., *Primary Examiner.*

W. S. RATCLIFF, JR., *Assistant Examiner.*